June 7, 1955   R. R. GRITZKE   2,710,185
LEAF SPRING WITH COMPLEMENTAL SQUEAK SILENCING MEANS
Filed July 20, 1951
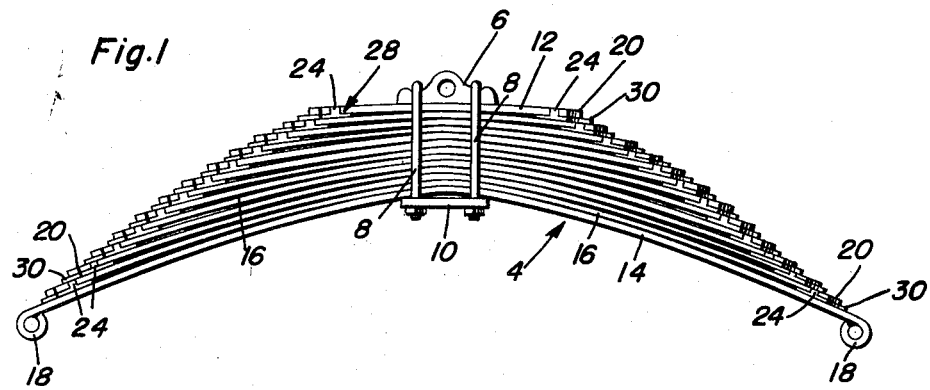
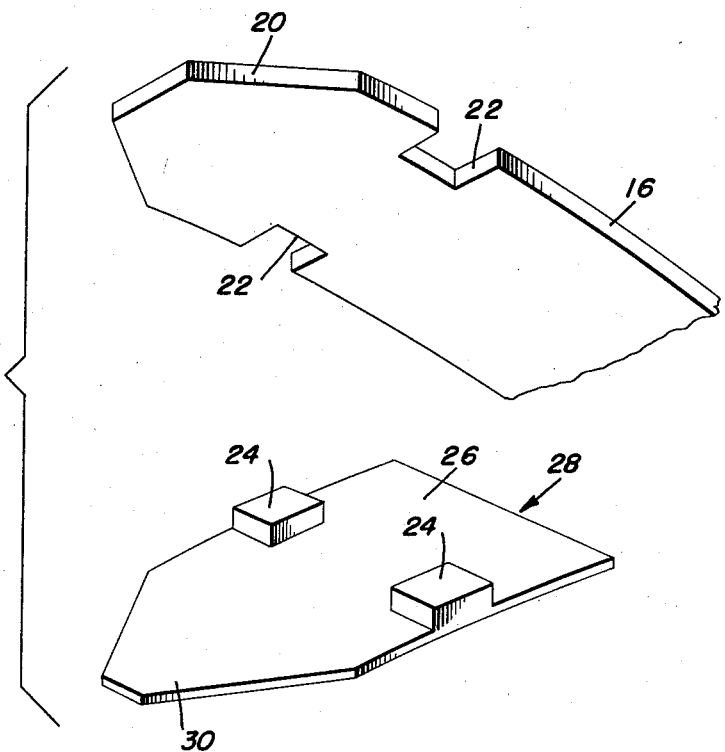
Ralph R. Gritzke
INVENTOR.

United States Patent Office 2,710,185
Patented June 7, 1955

2,710,185

LEAF SPRING WITH COMPLEMENTAL SQUEAK SILENCING MEANS

Ralph R. Gritzke, Lackawanna, N. Y.

Application July 20, 1951, Serial No. 237,699

2 Claims. (Cl. 267—49)

The present invention relates to certain new and useful improvements in curvilinear leaf springs, or the equivalent thereof, such as are currently used on and in connection with automobiles and other equivalent vehicles, and has more particular reference to practical, economical and reliable means for spacing the leaves apart and doing so in a manner to reduce friction noises and to consequently subdue and silence functioning between cooperating leaves.

It is a matter of common knowledge that the tip or free end portions of bowed or curvilinear leaf springs dig into companion portions of complemental leaf springs, with the result that there is not only much wear and tear but, what is most objectionable, highly undesirable noisy squeaks are put forth. Despite the use of lubricants and lubricant packed jackets and the like, automobile leaf springs still continue to squeak and squeal. It is therefore the obvious object of the instant invention to supplement the regular spring leaf assembly with special spacers interposed between coacting spring-ends. That is to say, the instant invention has to do with friction-reducing spacers which take the form of inserts.

More specifically, the invention appertains to leaf spacing inserts which are keyed to coacting leaves and which are themselves possessed of requisite compressibly resilient properties affording the desired wear resisting and noise-reducing and cushioning properties.

Briefly summarized, the free end portion of each spring leaf is provided with marginal notches constituting keepers. Cooperating with the notched end portion is the insert. The latter is of commercial plastics or rubber having the desired cushioning and compressibly resilient properties. It serves as a seat for the spring-end, projects beyond the spring-end and is provided with keeper lugs which are keyed in the keeper notches.

Other objects and advantages will become more readily apparent from the following description and the accompanying sheet of illustrative drawings.

In the accompanying drawings, wherein like numerals are employed to designate like parts throughout the views:

Figure 1 is a side elevational view of an automobile or equivalent vehicle suspension spring of the aforementioned multiple leaf semi-elliptic or curvilinear type, the same embodying the spacing and cushioning inserts constituting the novelty herein disclosed.

Figure 2 is an enlarged view showing a fragmentary end portion of one spring leaf and showing, in addition, the complemental or companion noise-minimizing and spacing insert.

Referring now to the drawings and first to Figure 1, it will be obvious that the complete or over-all spring construction, which is a semi-elliptical type, is denoted, as a unit, by the numeral 4. This is made up of a plurality of progressively stepped individual spring leaves or leaf springs, and these are stacked as usual and are secured together by a clamp embodying an anvil block 6, clevises 8—8 and a coacting nut-retained cleat 10.

For convenience, the uppermost leaf spring is denoted at 12 and the lower leaf spring at 14 and the intervening ones are denoted at 16. All of the springs, so far as the invention is concerned, will be the same, except the lowermost spring, which will have the customary terminal curls 18—18. All of the other springs are the same, and a description of one will suffice for all. As a matter of fact, a description of one end will be sufficient here, it is believed. Reference is therefore had to Figure 2, wherein the end portion 20 of the leaf spring 16 is shown as truncated and of general wedge-shaped form. The principal addition or change here is that the marginal edges of the spring are provided with keeper notches 22—22. These are adapted to accommodate keying or keeper lugs 24—24 on the body portion 26 of the rubber or equivalent spacing insert 28. The spacer or insert also has an extended narrowed tip or end portion 30 and this is likewise of truncated wedge-shaped form. It will be noticed that each spacer underlies the coacting leaf spring and has its end portion projecting beyond the corresponding end portion of said leaf spring. The body portion of the spacer underlies the notched portion of the spring and the keepers 24 extend into the keeper notches 22—22. The notches are preferably non-circular and the lugs are likewise non-circular so that there is little chance of the lug-equipped spacer becoming accidentally displaced once it is applied and keyed to the coacting leaf spring.

It will be understood that the insert is locked in a straight position at all times and that it is rarely, if ever, possible for it to turn in relation to the spring It underlies or covers the entire notched end portion of the leaf at the greatest point of friction, and therefore successfully prevents squeaking of the spring. For a narrow leaf, the keeper lugs will be made proportionately smaller, and vice versa for larger leaves the proportions will be increased throughout and in proper progression. Obviously, the insert can be used only on a solid steel spring. The insert may be properly made from different material such as rubber, belting and commercial plastics. It has been found that if a plastic material is preferred, the one known as polystyrene will be most suitable, because this particular plastic is pliable, durable and, in fact, is superior, it is believed, to rubber in that it will outlast most any grade of rubber which could be used. Belting can be used and is quite durable. In using belting the keying lugs will have to be stapled on the body portion of the insert, whereas in cases of rubber and plastics the unit will be molded from one piece.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A vehicle suspension leaf spring structure comprising at least one pair of superposed curvilinear spring leaves, the uppermost leaf being provided adjacent its opposite ends with marginal keeper notches, said notches being situated in the longitudinal edge portions of the leaf and opening outwardly through said edge portions and being spaced inwardly from the terminal ends, and inserts interposed between the coacting end portions of the two leaves, said inserts being of compressibly resilient material and each insert being provided on its respective longitudinal edge portions with keeper lugs, said lugs being removably seated in the coacting keeper notches, the outer ends of the respective inserts projecting beyond the corresponding ends of the uppermost leaf to prevent the tip ends of said leaf, having direct frictional rubbing contact with the corresponding ends of the complemental underlying leaf, said notches being non-circular in shape and said lugs corresponding in shape with said notches.

2. A vehicle suspension leaf spring structure comprising at least one pair of superposed curvilinear spring leaves, the uppermost leaf being provided adjacent its opposite ends with marginal keeper notches, said notches being situated in the respective longitudinal edge portions of the leaf and opening outwardly through said edge portions and being spaced inwardly from the terminal ends, and inserts interposed between the coacting end portions of the two leaves, said inserts being of compressibly resilient material and each insert being provided on its respective longitudinal edge portions with keeper lugs, said lugs being removably seated in the coacting keeper notches, the outer ends of the respective inserts projecting beyond the corresponding ends of the uppermost leaf to prevent the tip ends of said leaf from having direct frictional rubbing contact with the corresponding ends of the complemental underlying leaf, each notch being substantially square in plan, each lug being likewise square in plan and corresponding in size with the inner marginal portions of the companion notch, and each lug being of a thickness corresponding to the thickness of the uppermost leaf.

References Cited in the file of this patent

UNITED STATES PATENTS

| 1,552,529 | Woodhead | Sept. 8, 1925 |
| 2,019,441 | Watson | Oct. 29, 1935 |
| 2,161,838 | Thompson | June 13, 1939 |
| 2,319,172 | Watson et al. | May 11, 1943 |